United States Patent
Yao

(10) Patent No.: US 11,874,903 B2
(45) Date of Patent: Jan. 16, 2024

(54) USER INTERFACE SWITCHING METHOD AND TERMINAL

(71) Applicant: HUAWEI TECHNOLOGIES CO., LTD., Guangdong (CN)

(72) Inventor: Dongdong Yao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/223,414

(22) Filed: Apr. 6, 2021

(65) Prior Publication Data

US 2021/0224360 A1 Jul. 22, 2021

Related U.S. Application Data

(63) Continuation of application No. 15/991,693, filed on May 29, 2018, now Pat. No. 11,003,745, which is a (Continued)

(30) Foreign Application Priority Data

Nov. 30, 2015 (CN) .......................... 201510859719.5

(51) Int. Cl.
*G06F 21/12* (2013.01)
*G06F 21/62* (2013.01)
(Continued)

(52) U.S. Cl.
CPC ............ *G06F 21/123* (2013.01); *G06F 21/34* (2013.01); *G06F 21/62* (2013.01);
(Continued)

(58) Field of Classification Search
CPC ........ G06F 21/123; G06F 21/34; G06F 21/62; G06F 21/6245; G06F 21/6281;
(Continued)

(56) References Cited

U.S. PATENT DOCUMENTS

2005/0188210 A1* 8/2005 Perlin ..................... G06F 21/83
713/183
2010/0306076 A1 12/2010 Taveau et al.
(Continued)

FOREIGN PATENT DOCUMENTS

| CN | 103136488 | 6/2013 |
|---|---|---|
| CN | 103718187 | 4/2014 |

(Continued)

OTHER PUBLICATIONS

GlobalPlatform Device Technology Trusted User Interface API, Version 1.0, Jun. 2013 (Year: 2013).*
(Continued)

*Primary Examiner* — Henry Tsang
(74) *Attorney, Agent, or Firm* — Fish & Richardson P.C.

(57) ABSTRACT

The application provides an example user interface switching method and an example terminal. The method includes, after the terminal triggers a trusted user interface (TUI) display request of a client application (CA) according to a first operation on a CA interface by a user, the terminal switches a display environment of the CA from a rich execution environment (REE) to a trusted execution environment (TEE) according to the TUI display request, and then displays a trusted application (TA) interface that is of the CA and that is in the TEE. The method also includes performing, by the user, an operation of inputting sensitive information on the TA interface.

20 Claims, 8 Drawing Sheets

Related U.S. Application Data continuation of application No. PCT/CN2016/105159, filed on Nov. 9, 2016.

(51) Int. Cl.
*G06F 21/83* (2013.01)
*G06F 21/74* (2013.01)
*G06F 21/34* (2013.01)
*G06F 21/84* (2013.01)

(52) U.S. Cl.
CPC ...... *G06F 21/6245* (2013.01); *G06F 21/6281* (2013.01); *G06F 21/74* (2013.01); *G06F 21/83* (2013.01); *G06F 21/84* (2013.01); *G06F 2221/031* (2013.01)

(58) Field of Classification Search
CPC .......... G06F 21/74; G06F 21/83; G06F 21/84; G06F 2221/031
See application file for complete search history.

(56) References Cited

U.S. PATENT DOCUMENTS

| | | |
|---|---|---|
| 2012/0299831 A1 | 11/2012 | Lioy |
| 2013/0145475 A1 | 6/2013 | Ryu et al. |
| 2013/0254842 A1* | 9/2013 | Jang ............... H04W 12/069 726/3 |
| 2014/0007251 A1 | 1/2014 | Spitz |
| 2014/0150104 A1 | 5/2014 | Bousquet et al. |
| 2016/0142890 A1* | 5/2016 | Drozdovskyy ..... H04W 12/086 455/419 |
| 2016/0364341 A1* | 12/2016 | Banginwar ......... G06F 9/45558 |

FOREIGN PATENT DOCUMENTS

| | | |
|---|---|---|
| CN | 103745155 A | 4/2014 |
| CN | 104143065 | 11/2014 |
| CN | 104205112 | 12/2014 |
| CN | 104318182 | 1/2015 |
| CN | 104376274 | 2/2015 |
| CN | 104392188 | 3/2015 |
| CN | 104424412 | 3/2015 |
| CN | 104809413 | 7/2015 |
| CN | 105528554 | 4/2016 |

OTHER PUBLICATIONS

Arfaqui Ghada et al: ""Trusted Execution Environments: A Look under the Hood"", 2014 2nd IEEE International Conference on Mobile Cloud Computing, Services, and Engineering,2014, XP032605934, pp. 259-266.

GlobalPlalform Device Technology Trusted User Interface API Version1.0, GlobalPlalform, dated Jun. 2013, total 48 pages.

Office Action in Chinese Appln. No. 201910227682.2, dated Sep. 28, 2022, 20 pages (with English translation).

\* cited by examiner

FIG. 3

USER INTERFACE SWITCHING METHOD AND TERMINAL

CROSS-REFERENCE TO RELATED APPLICATIONS

This application is a continuation of U.S. patent application Ser. No. 15/991,693, filed on May 29, 2018, which is a continuation of International Application No. PCT/CN2016/105159, filed on Nov. 9, 2016, which claims priority to Chinese Patent Application No. 201510859719.5, filed on Nov. 30, 2015. All of the aforementioned patent applications are hereby incorporated by reference in their entireties.

TECHNICAL FIELD

The present invention relates to communications technologies, and in particular, to a user interface switching method and a terminal.

BACKGROUND

As intelligent terminals such as mobile phones become popular, an increasing quantity of users shop online directly by using mobile phones. Consequently, security problems become increasingly severe. Currently, in mainstream operating systems such as Android, application programs are installed without strict management and control. Once a user inadvertently installs a malicious program on a mobile phone, a threat may be posed to security of software such as Alipay on the mobile phone.

For payment software such as Alipay on a mobile phone, many mechanisms for password authentication and data encryption are internally provided to ensure security of data transmission. However, critical steps such as input of a user password and input of a user account are inevitably exposed in software environment of an operating system. Once these input operations are intercepted by a malicious program, sensitive information such as the user password and the user account may be stolen.

An existing solution of preventing a malicious program from intercepting an input operation by a user is to set a random keyboard. Specifically, when the user performs the input operation, keys of a keyboard are randomly disorganized (that is, the keys of the keyboard are randomly arranged each time the user performs an input operation), so as to prevent the malicious program from stealing sensitive information such as a user password and a user account.

However, this solution of setting a random keyboard only makes it more difficult to steal sensitive information such as a user password and a user account. A malicious program may still read a random keyboard and an input operation by a user. Therefore, security of this solution needs to be enhanced.

SUMMARY

For the foregoing defects in the prior art, the present invention provides a user interface switching method and a terminal, to enhance security of input by a user.

According to a first aspect, an embodiment of the present invention provides a user interface switching method, where the method is used for a terminal, a client application CA runs on the terminal, a rich execution environment and a trusted execution environment are deployed on the terminal, and the method includes: triggering, by the terminal, a trusted user interface TUI display request of the CA according to a first operation on a CA interface of the CA by a user; then switching a display environment of the CA from the rich execution environment to the trusted execution environment according to the TUI display request; and displaying a trusted application TA interface that is of the CA and that is in the trusted execution environment, so that the user performs an operation of inputting sensitive information on the TA interface. In this case, a malicious program that runs in the REE cannot access a hardware device to obtain the input operation in the TEE by the user. Therefore, when an input operation by a user is performed by using the foregoing method, a possibility that sensitive information of the user is stolen is prevented, thereby effectively enhancing security of the input operation by the user.

With reference to the first aspect, in a first possible implementation manner of the first aspect, the terminal includes a display-related hardware device, the display-related hardware device is configured to display the CA interface and the TA interface, and the switching a display environment of the CA from the rich execution environment to the trusted execution environment according to the TUI display request includes:

controlling, according to the TUI display request of the CA by using a driver that is of the hardware device and that is in the rich execution environment, the hardware device to exit a current non-secure mode, where the non-secure mode is a running mode that corresponds to the hardware device and that is in the rich execution environment; and controlling, according to first switching information by using a driver that is of the hardware device and that is in the trusted execution environment, the hardware device to enter a secure mode, where the first switching information is used to indicate that the hardware device has exited the non-secure mode, and the secure mode is a running mode that corresponds to the hardware device and that is in the trusted execution environment.

With reference to the first possible implementation manner of the first aspect, in a second possible implementation manner of the first aspect, the displaying a trusted application TA interface that is of the CA and that is in the trusted execution environment includes:

running, in the trusted execution environment, a TA corresponding to the CA; and displaying, in the trusted execution environment, the TA interface by invoking the hardware device in the secure mode.

With reference to the first aspect, in a third possible implementation manner of the first aspect, the method further includes: switching from a current TA interface to a response interface of a first event in the rich execution environment according to a non-secure-event response message, where the non-secure-event response message is triggered by the first event in the rich execution environment; and displaying the TA interface again according to a response feedback message, where the response feedback message indicates that the user of the terminal completes processing of the first event by using the response interface.

The method can process, in a process of displaying a TUI, a non-secure event in time, and has high flexibility.

With reference to the third possible implementation manner of the first aspect, in a fourth possible implementation manner of the first aspect, the terminal includes a display-related hardware device, the display-related hardware device is configured to display the CA interface and the TA interface, and the switching from a current TA interface to a response interface of a first event in the rich execution environment according to a non-secure-event response message specifically includes:

triggering a Request for TUI display pause according to the non-secure-event response message;

controlling, according to the Request for TUI display pause by using a driver that is of the hardware device and that is in the trusted execution environment, the hardware device to exit a current secure mode, where the secure mode is a running mode that corresponds to the hardware device and that is in the trusted execution environment;

controlling, according to second switching information by using a driver that is of the hardware device and that is in the rich execution environment, the hardware device to enter a non-secure mode, where the second switching information is used to indicate that the hardware device has exited the secure mode, and the non-secure mode is a running mode that corresponds to the hardware device and that is in the rich execution environment; and displaying the response interface of the first event in the rich execution environment by invoking the hardware device that has switched to the non-secure mode.

With reference to any one of the first aspect or the first to the fourth possible implementation manners of the first aspect, in a fifth possible implementation manner of the first aspect, the method further includes:

switching from the current TA interface to the CA interface according to a Request for TUI display exit, where the Request for TUI display exit is triggered by a second operation on the TA interface by the user.

The method implements switching from secure display to non-secure display, and facilitates a user to perform a subsequent operation on a non-secure interface.

With reference to the fifth possible implementation manner of the first aspect, in a sixth possible implementation manner of the first aspect, the terminal includes the display-related hardware device, and the switching from the current TA interface to the CA interface according to a Request for TUI display exit specifically includes:

controlling, according to the Request for TUI display exit by using the driver that is of the hardware device and that is in the trusted execution environment, the hardware device to exit the current secure mode, where the secure mode is a running mode that corresponds to the hardware device and that is in the trusted execution environment;

controlling, according to third switching information by using the driver that is of the hardware device and that is in the rich execution environment, the hardware device to enter the non-secure mode, where the third switching information is used to indicate that the hardware device has exited the secure mode, and the non-secure mode is a running mode that corresponds to the hardware device and that is in the rich execution environment; and displaying, in the rich execution environment, the CA interface by invoking the hardware device that has switched to the non-secure mode.

According to a second aspect, an embodiment of the present invention provides a terminal, where a client application CA runs on the terminal, a rich execution environment and a trusted execution environment are deployed on the terminal, and the terminal includes:

a triggering module, configured to trigger a trusted user interface TUI display request of the CA according to a first operation on a CA interface of the CA by a user, where the CA interface is a user interface that is of the CA and that is in the rich execution environment;

a switching module, configured to switch a display environment of the CA from the rich execution environment to the trusted execution environment according to the TUI display request; and a display module, configured to display a trusted application TA interface that is of the CA and that is in the trusted execution environment, where the TA interface is used by the user of the terminal to input personal information.

With reference to the second aspect, in another possible implementation manner of the second aspect, operating principles of the modules in the terminal are similar to the implementation manners of the first aspect. For details, reference may be made to the first to the sixth possible implementation manners of the first aspect.

According to a third aspect, an embodiment of the present invention provides a terminal, where a client application CA runs on the terminal, a rich execution environment and a trusted execution environment are deployed on the terminal, and the terminal includes; a processor, a memory, and a hardware device configured to display an interface of the terminal, where the memory stores a program or an instruction, and the processor invokes the program or the instruction that is stored in the memory, to;

trigger a trusted user interface TUI display request of the CA according to a first operation on a CA interface of the CA by a user, where the CA interface is a user interface that is of the CA and that is in the rich execution environment;

switch a display environment of the CA from the rich execution environment to the trusted execution environment according to the TUI display request; and control the hardware device to display a trusted application TA interface that is of the CA and that is in the trusted execution environment, where the TA interface is used by the user of the terminal to input personal information.

With reference to the third aspect, in another possible implementation manner of the third aspect, an operating principle of the processor in the terminal is similar to the implementation manners of the first aspect. For details, reference may be made to the first to the sixth possible implementation manners of the first aspect.

By means of the user interface switching method and the terminal that are provided in the embodiments of the present invention, after the terminal triggers a TUI display request of a CA according to a first operation on a CA interface by a user, the terminal switches a display environment of the CA from an REE to a TEE according to the TUI display request, and then displays a TA interface that is of the CA and that is in the TEE. In this case, the user may perform an operation of inputting sensitive information on the TA interface, and a malicious program that runs in the REE cannot access a hardware device to obtain the input operation in the TEE by the user. Therefore, when an input operation by a user is performed by using the foregoing method, a possibility that sensitive information of the user is stolen is prevented, thereby effectively enhancing security of the input operation by the user.

BRIEF DESCRIPTION OF DRAWINGS

FIG. 3 is a schematic diagram of user interface switching of a terminal according to the present invention;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

A terminal described in the embodiments of the present invention may be another intelligent device such as a mobile phone, a personal digital assistant (PDA), or a tablet computer. A non-secure running environment and a secure running environment may be deployed on the terminal. The non-secure running environment is a rich execution environment (REE) on the terminal, and an operating system such as Android, iOS, or Windows Phone runs in the non-secure running environment. The secure running environment is a trusted execution environment (TEE), and a secure operating system runs in the secure running environment. Software and hardware resources accessed in the TEE are isolated from the REE. Software and hardware resources in the terminal may be marked with two execution environment states. Software and hardware resources that are marked with a secure execution state can be accessed only in the TEE, and software and hardware resources that are marked with a non-secure execution state can be accessed in the two execution environments. A secure running environment isolated from the REE is constructed in the TEE, and can provide a secure execution environment to authorized trusted software.

An interface switching method for a terminal and a terminal that are provided in the embodiments of the present invention aim to resolve a technical problem in the prior art that security is low when a random keyboard is configured to prevent a malicious program from intercepting an input operation by a user.

Figure 1:
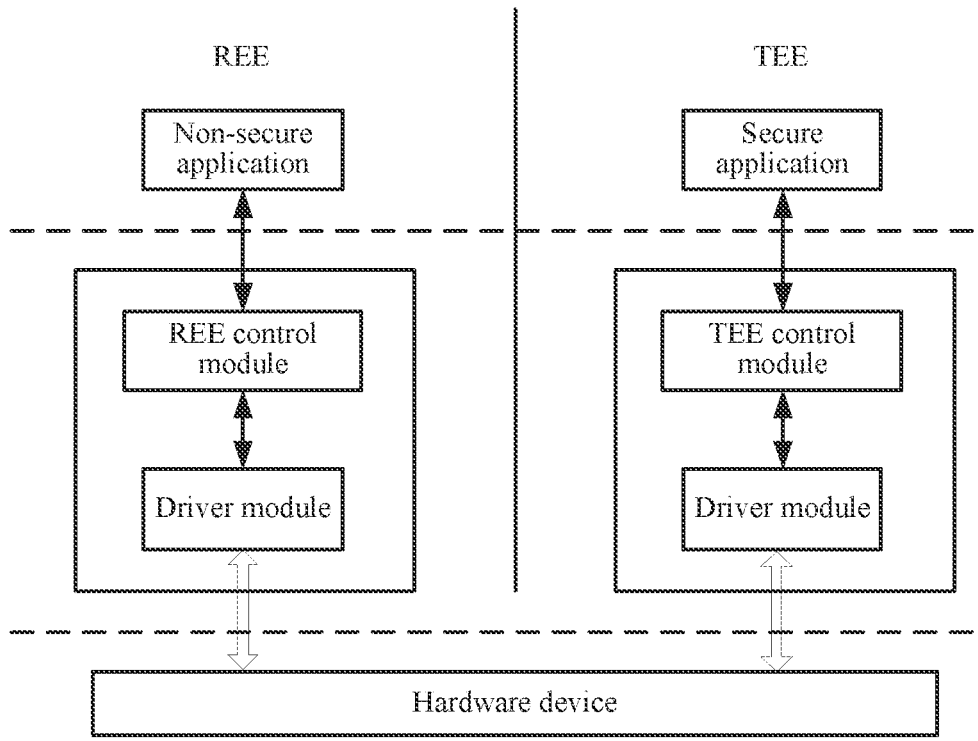
FIG. 1 is a schematic structural diagram of a framework of an REE and a TEE.

FIG. 1 is a schematic structural diagram of a framework of an REE and a TEE. As shown in FIG. 1, in the REE, various client applications CAs are installed, and an REE control module and a driver module are deployed. In the TEE, various trusted applications TAs are installed, and a TEE control module and a driver module are deployed. The driver modules in both the REE and the TEE can access corresponding hardware devices. The CA may be specifically other application software involving input of sensitive information such as an account and a password, for example, Alipay(or Apple pay or Huawei pay) and a bank client. The TA is a secure application corresponding to the CA, and is configured to perform an operation of inputting sensitive information involved in the CA. The CA may access the TA by using the REE control module and the TEE control module, to implement a corresponding secure operation. Specifically, the REE control module may invoke the driver module on a side of the REE according to an access request of the CA, to drive a hardware device to exit a non-secure operating mode. After the hardware device exits the non-secure operating mode, the TEE control module may invoke the driver module on a side of the TEE according to a message sent by the REE control module, to drive the hardware device to switch an operating mode, to implement hardware isolation from the REE, and then may invoke a corresponding TA to implement access to the TA by the CA. All specific functions of the REE control module, the TEE control module, and the driver modules in the two running environments can be implemented by using a processor in the terminal.

The following describes technical solutions of the present invention in detail by using specific embodiments. The following specific embodiments may be mutually combined, and same or similar concepts or processes may not be repeatedly described in some embodiments.

Figure 2:
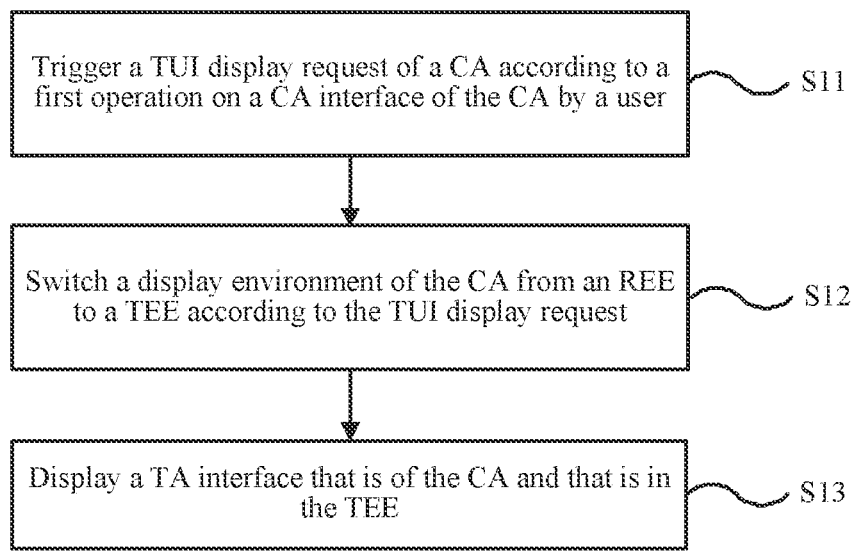
FIG. 2 is a schematic flowchart of Embodiment 1 of a user interface switching method according to the present invention.

FIG. 2 is a schematic flowchart of Embodiment 1 of a user interface switching method according to the present invention. The method may be executed by a terminal. On the terminal, a client application CA runs, and an REE and a TEE are deployed. As shown in FIG. 2, the method provided in this embodiment includes the following steps.

Step S11: Trigger a TUI display request of the CA according to a first operation on a CA interface of the CA by a user.

Specifically, the CA interface is a user interface that is of the CA and that is in the REE. When the user performs the first operation on the CA interface (for example, the user clicks a location for inputting sensitive information), to enter an interface for inputting sensitive information (for example, a virtual keyboard) in a next step, the CA is triggered to generate the trusted user interface TUI display request. The first operation may be a clicking operation on a touchscreen by the user, or may be a clicking operation on a mechanical keyboard by the user.

Step S12: Switch a display environment of the CA from the REE to the TEE according to the TUI display request.

Specifically, the TEE is a secure running environment, and the terminal switches the display environment of the CA from the REE to the TEE according to the TUI display request. In this case, various application software (including some non-malicious software and malicious software) in the REE cannot access the hardware device to obtain an operation in the TEE. Therefore, a secure operation function such as TUI display can be implemented. Specifically, the display environment may be a background running environment of the CA, or may be a software environment for displaying the CA. In other words, the CA may only switch the software environment for displaying the CA, and the background running environment does not change. When the display environment of the CA is switched from the REE to the TEE, only a software environment that is on the terminal and that is configured to display the CA interface may be switched from the REE to the TEE, or a system running environment in which the CA is located on the terminal may be switched from the REE to the TEE.

Step S13: Display a TA interface that is of the CA and that is in the TEE.

Specifically, the TA interface is used by the user of the terminal to input personal information, and a TA is deployed in the TEE. When the CA is deployed in the REE, a TA corresponding to the CA may be deployed in the TEE, to implement the secure operation function.

After the terminal switches the display environment of the CA from the REE to the TEE according to the TUI display request, a secure execution environment is provided to subsequent operations. The terminal may then invoke the TA to display, in the TEE, the TA interface, so that the user may perform an operation of inputting sensitive information on the TA interface. In this case, the operation of inputting sensitive information by the user is performed in the secure TEE, and a non-secure application (for example, malicious software that includes a malicious program) in the REE cannot obtain the input operation on the TA interface by the user, thereby preventing the sensitive information of the user from being stolen by the malicious program, and enhancing security of the input operation by the user. Specifically, a processing module such as an REE control module in the terminal may obtain, at the same time when obtaining the TUI display request sent by the CA, an identifier of the TA corresponding to the CA on which the user performs the first operation, for example, an ID of the TA. The terminal may invoke the corresponding TA according to the identifier of the TA.

To describe the technical solution in this embodiment more clearly, the following provides illustrative description by particularly using a schematic diagram of specific interface switching.

Figure 3:
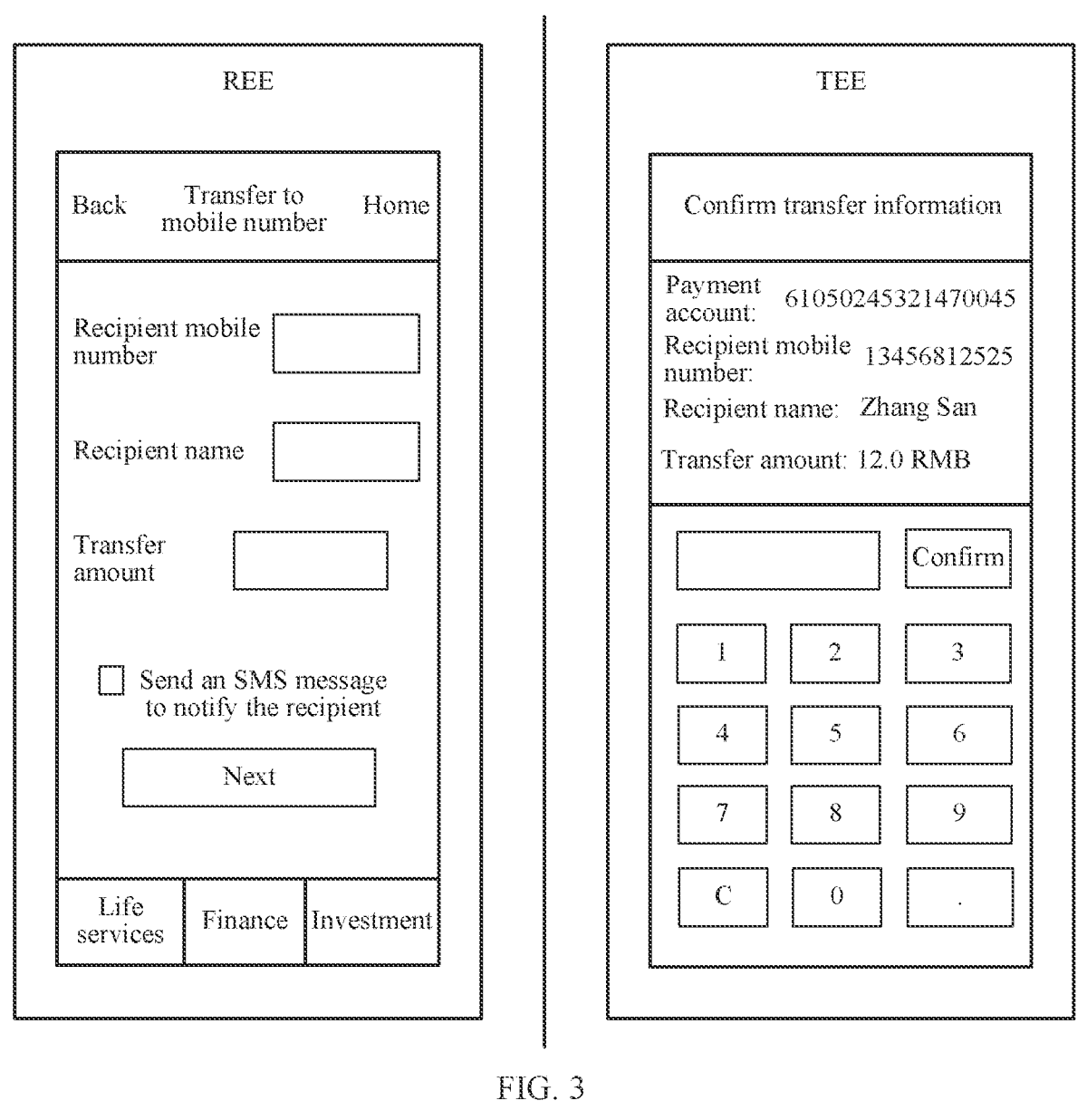

FIG. 3 is a schematic diagram of user interface switching of a terminal according to the present invention. As shown in FIG. 3, a user performs, by using a payment application (that is, a CA), an operation of transfer to a mobile number. When the user clicks "Next" (that is, a first operation) on a CA interface in an REE to perform a password input operation, the terminal switches a display environment from the REE to a TEE according to the first operation, and display, in the TEE, an application interface (that is, a TA interface) that includes a virtual keyboard. The user confirms transfer information and then performs the password input operation on the TA interface. In this case, the password input operation by the user is in a secure running environment (that is, the TEE), and an application in a non-secure running environment (that is, the REE) cannot steal a password input by the user in the TEE, thereby ensuring security of the password input operation by the user.

By means of the user interface switching method provided in this embodiment, after a terminal triggers a TUI display request of a CA according to a first operation on a CA interface by a user, the terminal switches a display environment of the CA from an REE to a TEE according to the TUI display request, and then displays a TA interface that is of the CA and that is in the TEE. In this case, the user may perform an operation of inputting sensitive information on the TA interface, and a malicious program that runs in the REE cannot access a hardware device to obtain the input operation in the TEE by the user. Therefore, when an input operation by a user is performed by using the foregoing method, a possibility that sensitive information of the user is stolen is prevented, thereby effectively enhancing security of the input operation by the user.

Figure 4:
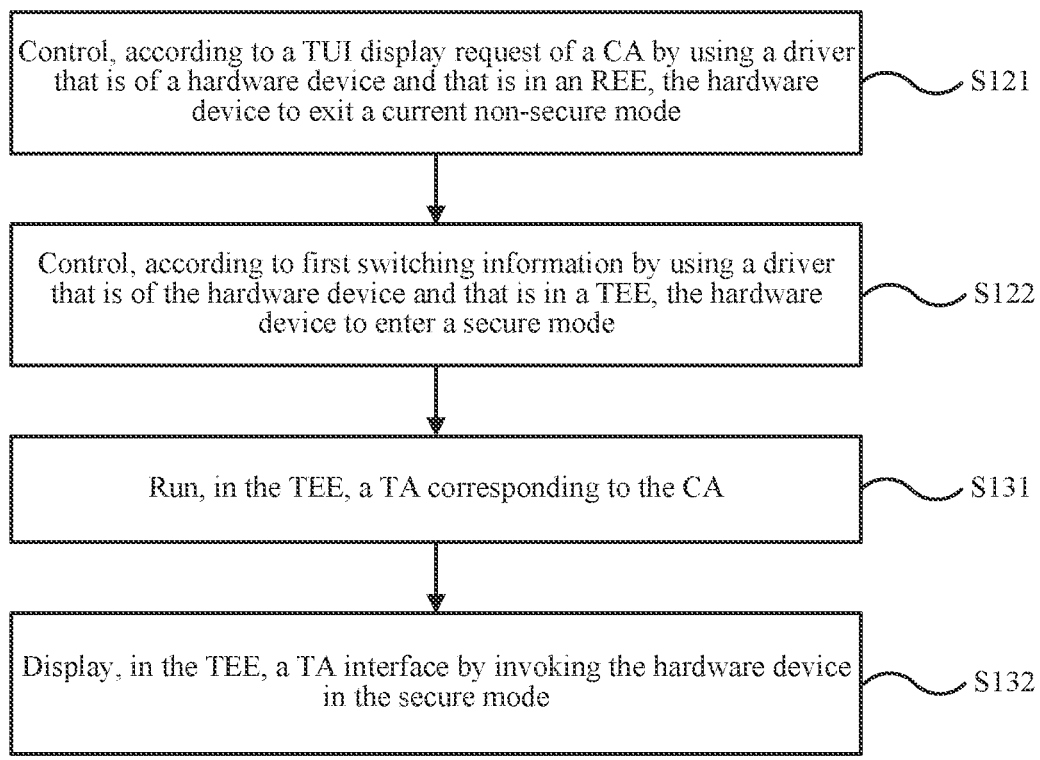
FIG. 4 is a schematic flowchart of Embodiment 2 of a user interface switching method according to the present invention.

FIG. 4 is a schematic flowchart of Embodiment 2 of a user interface switching method according to the present invention. This embodiment is a specific implementation manner of step S12 and step S13 in the embodiment shown in FIG. 2. In this embodiment, the terminal includes a display-related hardware device, and the hardware device is configured to display the CA interface and the TA interface. Based on the embodiment shown in FIG. 2, as shown in FIG. 4, the switching a display environment of the CA from the REE to the TEE according to the TUI display request in step S12 specifically includes the following steps.

Step S121: Control, according to the TUI display request of the CA by using a driver that is of the hardware device and that is in the REE, the hardware device to exit a current non-secure mode.

Specifically, the display-related hardware device may include a display memory, a display device, and a touch-screen or a mechanical keyboard, and may further include a fingerprint device, a near field communication (NFC) device, a secure element (SE), and the like. By using a related security expansion technology (for example, a Trust Zone technology provided in an ARM chip), access modes of these devices may be configured to two operating modes: a secure mode and a non-secure mode. The secure mode is a running mode that corresponds to the hardware device and that is in the TEE, and the non-secure mode is a running mode that corresponds to the hardware device and that is in the REE.

The driver (that is, the driver module on the side of the REE in FIG. 1) of the display-related hardware device is deployed in the REE for the terminal. The REE control module in the terminal may drive, by using the driver in the REE, the display-related hardware device to exit a non-secure mode configuration. Specifically, the REE control module in the terminal may send a signaling message to the driver in the REE, to instruct the driver to drive the hardware device to exit the non-secure mode configuration. After the hardware device exits the non-secure mode configuration, the driver may feed back exit complete signaling to the REE control module.

Step S122: Control, according to first switching information by using a driver that is of the hardware device and that is in the TEE, the hardware device to enter a secure mode.

Specifically, after the hardware device exits the non-secure mode configuration, the REE control module in the terminal may send first switching information to a TEE control module, to indicate that the hardware device has exited the non-secure mode. The driver (that is, the driver module on the side of the TEE in FIG. 1) of the display-related hardware device is also deployed in the TEE for the terminal. After receiving the first switching information, the TEE control module may drive, by using the driver in the TEE, the display-related hardware device to enter a secure mode configuration. Similar to step S121, the TEE control module may send a signaling message to the driver in the TEE, to instruct the driver to drive the hardware device to enter the secure mode configuration. After the hardware device enters the secure mode configuration, the driver may feed back entry complete signaling to the TEE control module. In this case, the display environment of the CA has also been switched from the REE to the TEE.

For the foregoing drivers, that the display-related hardware device includes a display memory, a display device, and a touchscreen is used as an example. A display driver, a general purpose input/output (GPIO) driver, and a touchscreen driver are deployed in both the REE and the TEE. The display driver is configured to drive switching of operating modes of the display memory and the display device, and the GPIO driver and the touchscreen driver are configured to drive switching of an operating mode of the touchscreen. Certainly, if the terminal further includes another display-related hardware device, a corresponding driver may be added to the REE and the TEE.

Further, in this embodiment, the displaying a TA interface that is of the CA and that is in the TEE in step S13 may specifically include the following steps.

Step S131: Run, in the TEE, a TA corresponding to the CA.

Specifically, after the display-related hardware device enters the secure mode configuration, the TEE control module in the terminal may invoke the TA or instruct another display-related functional module to invoke the TA, to run, in the TEE, the application.

Step S132: Display, in the TEE, the TA interface by invoking the hardware device in the secure mode.

Specifically, when invoking the TA, the terminal may invoke the hardware device in the secure mode at the same time, to enable the hardware device to display, in the TEE, the TA interface, so that the user performs an operation of inputting sensitive information on the TA interface.

Figure 5:
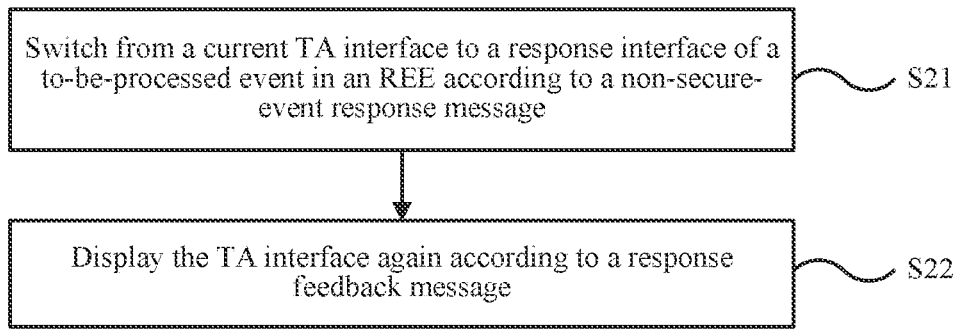
FIG. 5 is a schematic flowchart of Embodiment 3 of a user interface switching method according to the present invention.

FIG. 5 is a schematic flowchart of Embodiment 3 of a user interface switching method according to the present invention. This embodiment is a specific process of processing a non-secure event in a process of performing, by the terminal, TUI display in the TEE in the foregoing embodiments. Based on all the foregoing embodiments, as shown in FIG. 5, in this embodiment, after the displaying a TA interface that is of the CA and that is in the TEE in step S13, the method in this embodiment further includes the following steps.

Step S21. Switch from a current TA interface to a response interface of a first event in the REE according to a non-secure-event response message.

In the process of performing, by the terminal, TUI display, a first event such as an incoming call and an alarm clock may occur. These events are non-secure events. In this case, the terminal may pause the TUI display to process such a non-secure event. Specifically, after the terminal monitors a first event, a non-secure-event response message that is triggered by the first event is generated. In this case, the terminal needs to switch from the current TA interface to a response interface of the first event in the REE, so that the user processes, in the REE, the non-secure event by using an application (for example, a telephone application, or an alarm clock application) corresponding to the non-secure event. Optionally, the terminal may listen to a non-secure event by using an internal non-secure event listening device, and then generate the non-secure-event response message.

Step S22: Display the TA interface again according to a response feedback message.

Specifically, after the user finishes processing the non-secure event, the non-secure event listening device may send a response feedback message to the REE control module in the terminal. The response feedback message indicates that the user of the terminal completes processing of the non-secure event by using the response interface. After receiving the message, the terminal switches a display environment of the CA from the REE to the TEE, to invoke the TA in the TEE to display the TA interface (that is, perform TUI display) again. When displaying the TA interface, the terminal may invoke the TA again by using a pre-stored identifier of the TA that currently performs TUI display.

By means of the user interface switching method provided in this embodiment, a terminal switches from a current TA interface to a response interface of a first event in an REE according to a non-secure-event response message; and then, after completing processing of a non-secure event in the REE, displays the TA interface again according to a response feedback message. Therefore, the non-secure event can be processed in time in a TUI display process, and flexibility is high.

Figure 6:
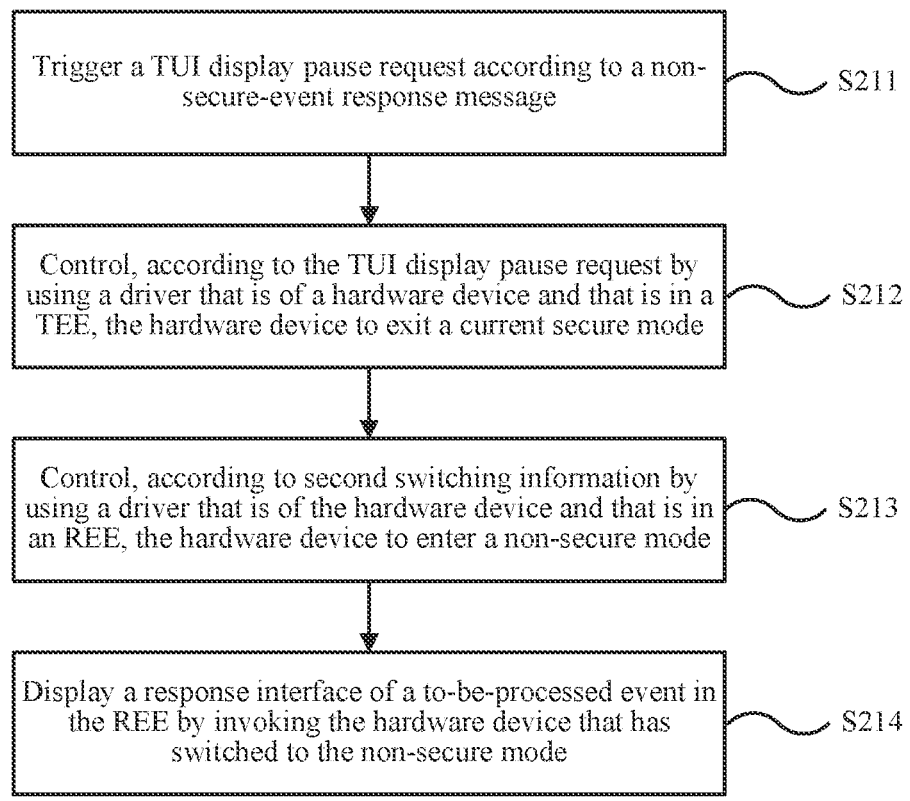
FIG. 6 is a schematic flowchart of Embodiment 4 of a user interface switching method according to the present invention.

FIG. 6 is a schematic flowchart of Embodiment 4 of a user interface switching method according to the present invention. This embodiment is a specific implementation manner of step S21 in the embodiment shown in FIG. 5. Based on the embodiment shown in FIG. 5, as shown in FIG. 6, in this embodiment, the switching from a current TA interface to a response interface of a first event in the REE according to a non-secure-event response message in step S21 specifically includes the following steps.

Step S211: Trigger a Request for TUI display pause according to the non-secure-event response message.

Specifically, after listening and obtaining the non-secure event, the internal non-secure event listening device of the terminal may send the non-secure-event response message to the REE control module. The REE control module triggers the Request for TUI display pause according to the received non-secure-event response message, and then sends the Request for TUI display pause to the TEE control module, to instruct the TEE control module to pause current displaying of a TUI interface.

Step S212: Control, according to the Request for TUI display pause by using the driver that is of the hardware device and that is in the TEE, the hardware device to exit a current secure mode.

Specifically, after receiving the Request for TUI display pause, the TEE control module in the terminal invokes the driver in the TEE to drive the display-related hardware device to exit the secure mode configuration. Similar to the foregoing embodiments, the TEE control module may instruct, by sending a signaling message to the driver in the TEE, the driver to drive the hardware device to exit the secure mode configuration.

Step S213: Control, according to second switching information by using the driver that is of the hardware device and that is in the REE, the hardware device to enter the non-secure mode.

Specifically, after the hardware device exits the secure mode configuration, the TEE control module in the terminal may send the second switching information to the REE control module, to indicate that the hardware device has exited the secure mode. After receiving the second switching information, the REE control module may drive, by using the driver in the REE, the display-related hardware device to enter the non-secure mode configuration, so as to provide a hardware basis for processing the non-secure event by the terminal. Similar to the foregoing embodiments, the REE control module may instruct, by sending a signaling message to the driver in the REE, the driver to drive the hardware device to enter the non-secure mode configuration. In this case, the display environment of the CA is switched from the REE to the TEE.

Step S214: Display the response interface of the first event in the REE by invoking the hardware device that has switched to the non-secure mode.

Specifically, after the hardware device enters the non-secure mode configuration, the display environment of the CA is switched from the TEE to the REE. In this case, the terminal may invoke the hardware device in the non-secure mode by using the REE control module, to display the response interface of the first event in the REE, so that the user performs an operation of processing the non-secure event.

After the user finishes processing of the non-secure event, the terminal needs to switch the display environment back to the TEE, to continue to perform TUI display. Referring to the foregoing embodiments, the terminal may learn, by using the non-secure event listening device, a message indicating that processing of the non-secure event is completed, and then send a response feedback message to the REE control module in the terminal. After receiving the message, the terminal switches the display environment of the CA from the REE to the TEE, and invokes the TA in the TEE to continue to display the TA interface. A specific processing process is similar to the process in which the terminal switches the display environment of the CA from the REE to the TEE in the embodiment shown in FIG. 4. Details are not described herein again.

Figure 7:
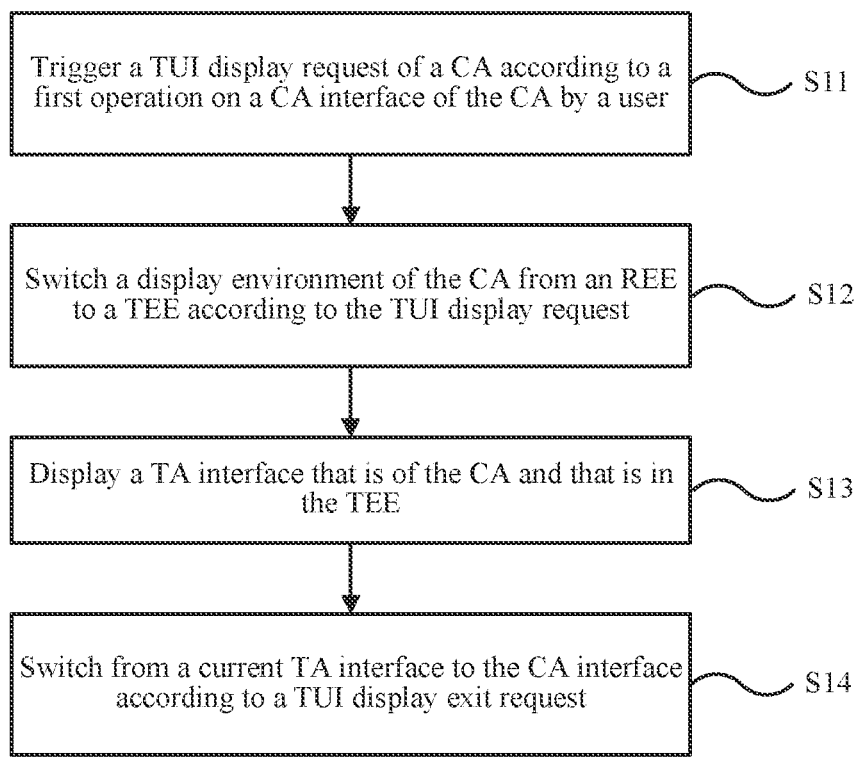
FIG. 7 is a schematic flowchart of Embodiment 5 of a user interface switching method according to the present invention.

FIG. 7 is a schematic flowchart of Embodiment 5 of a user interface switching method according to the present invention. This embodiment is a specific processing process of the terminal after the TUI display is completed. Based on the foregoing embodiments, as shown in FIG. 7, in this embodiment, after the displaying a TA interface that is of the CA and that is in the TEE in step S13, the method in this embodiment further includes the following step.

Step S14: Switch from the current TA interface to the CA interface according to a Request for TUI display exit.

After the terminal finishes processing of a non-secure event on a TUI display interface, the TUI display ends. In this case, the terminal may switch the display environment back to the REE, to perform a next CA operation. Specifically, after the user completes input of the sensitive information on the TA interface, the user performs a second operation (for example, the user clicks an input complete button) to trigger a next operation. The TA may generate a Request for TUI display exit according to the second operation, where the request is used to instruct the terminal to exit the TUI display.

The terminal may exit the current TA interface according to the Request for TUI display exit, switch the display environment of the CA from the REE to the TEE, and then invoke the CA to display the CA interface in the REE. Specifically, the terminal may invoke the CA in the following manners. In a first manner, at the same time when obtaining the TUI display request, the REE control module in the terminal may obtain an identifier of the CA on which the user performs the first operation, for example, an ID of the CA, and store the identifier of the CA; and after exiting the TUI display, the terminal may invoke the CA according to the identifier of the CA. In a second manner, at the same time when obtaining the Request for TUI display exit sent by the TA, the TEE control module in the terminal may obtain an identifier of the CA corresponding to the TA on which the user performs the second operation, and the terminal may invoke the CA according to the identifier of the CA.

The schematic diagram of user interface switching shown in FIG. 3 is used as an example. After inputting a password on the TA interface, the user clicks "OK" (that is, the second operation), and then the displaying of the TUI interface ends. The terminal switches the running environment from the TEE to the REE according to the second operation, and displays, in the REE, a CA interface (not shown) that includes a next operation, so that the user may continue to perform the next operation on the CA interface.

It should be noted that step S14 may also be performed after step S22.

By means of the user interface switching method provided in this embodiment, a terminal switches from a current TA interface to a CA interface according to a Request for TUI display exit, thereby implementing switching from secure display to non-secure display, and facilitating a user to perform a subsequent operation on a non-secure interface.

Figure 8:
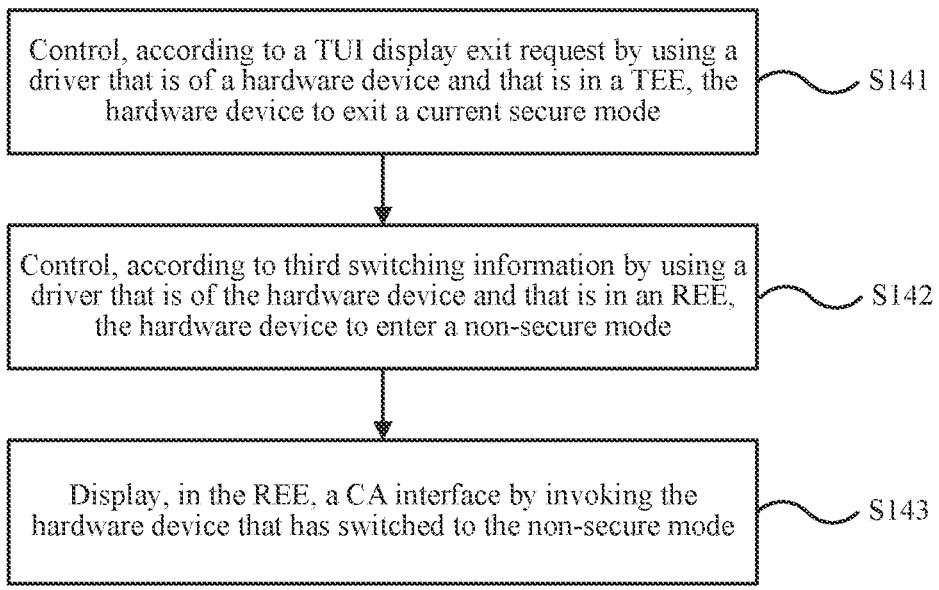
FIG. 8 is a schematic flowchart of Embodiment 6 of a user interface switching method according to the present invention.

FIG. 8 is a schematic flowchart of Embodiment 6 of a user interface switching method according to the present invention. This embodiment is a specific implementation manner of step S14 in the embodiment shown in FIG. 7. Based on the embodiment shown in FIG. 7, as shown in FIG. 8, in this embodiment, the switching from the current TA interface to the CA interface according to a Request for TUI display exit in step S14 specifically includes the following steps.

Step S141: Control, according to the Request for TUI display exit by using the driver that is of the hardware device and that is in the TEE, the hardware device to exit the current secure mode.

Specifically, after receiving the Request for TUI display exit, the TEE control module in the terminal may invoke the driver in the TEE to drive the display-related hardware device to exit the secure mode configuration. Similar to the foregoing embodiments, the TEE control module may instruct, by sending a signaling message to the driver in the TEE, the driver to drive the hardware device to exit the secure mode configuration.

Step S142: Control, according to third switching information by using the driver that is of the hardware device and that is in the REE, the hardware device to enter the non-secure mode.

Specifically, in an implementation manner, after the hardware device exits the secure mode configuration, the TEE control module in the terminal may send the third switching information to the REE control module, to indicate that the hardware device has exited the secure mode. After receiving the third switching information, the REE control module may drive, by using the driver in the REE, the display-related hardware device to enter the non-secure mode configuration. This provides a hardware basis for switching from the TEE to the REE by the terminal. Similar to the foregoing embodiments, the REE control module may instruct, by sending a signaling message to the driver in the REE, the driver to drive the hardware device to enter the non-secure mode configuration.

Step S143: Display, in the REE, the CA interface by invoking the hardware device that has switched to the non-secure mode.

Specifically, after the hardware device enters the non-secure mode configuration, the display environment of the CA is switched from the TEE to the REE. In this case, the terminal may invoke the hardware device in the non-secure mode by using the REE control module, to display CA interface in the REE, so that the user performs a next operation on the CA interface.

Figure 9:
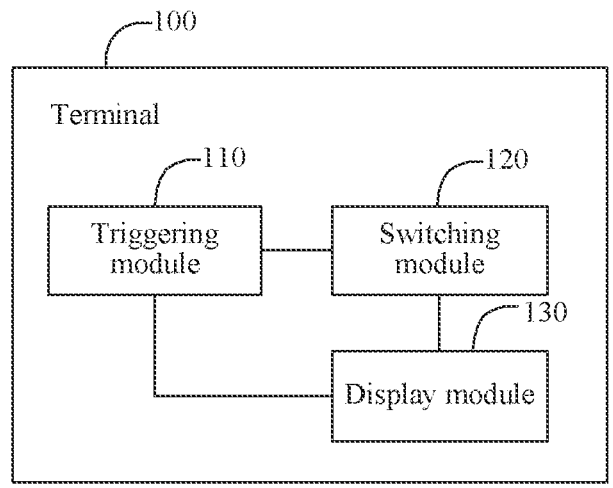
FIG. 9 is a schematic structural diagram of Embodiment 1 of a terminal according to the present invention.

FIG. 9 is a schematic structural diagram of Embodiment 1 of a terminal according to the present invention. On the terminal, a client application CA runs, and a rich execution environment and a trusted execution environment are deployed. As shown in FIG. 9, the terminal 100 in this embodiment includes: a triggering module 110, a switching module 120, and a display module 130.

The triggering module 110 is configured to trigger a trusted user interface TUI display request of the CA according to a first operation on a CA interface of the CA by a user, where the CA interface is a user interface that is of the CA and that is in the REE.

The switching module 120 is configured to switch a display environment of the CA from the rich execution environment to the trusted execution environment according to the TUI display request.

The display module 130 is configured to display a trusted application TA interface that is of the CA and that is in the trusted execution environment, where the TA interface is used by the user of the terminal to input personal information.

A function of the triggering module 110 in this embodiment may be specifically implemented by an input/output device and a processor that are in the terminal. A function of the switching module 120 may be specifically implemented by the processor in the terminal. A function of the display module 130 may be specifically implemented by the processor and a display device that are in the terminal.

The terminal provided in this embodiment may execute the foregoing method embodiments. The terminal and the method embodiments have similar implementation principles and technical effects. Details are not described herein again.

In an embodiment of the present invention, the function of the switching module 120 in the embodiment shown in FIG. 9 is further elaborated. In this embodiment, the terminal includes a display-related hardware device, and the display-related hardware device is configured to display the CA interface and the TA interface.

In an implementation manner of the present invention, the switching module 120 specifically includes: a non-secure control unit and a secure control unit.

The non-secure control unit is configured to control, according to the TUI display request of the CA by using a driver that is of the hardware device and that is in the REE, the hardware device to exit a current non-secure mode, where the non-secure mode is a running mode that corresponds to the hardware device and that is in the REE.

The secure control unit is configured to control, according to first switching information sent by the non-secure control unit, by using a driver that is of the hardware device and that is in the TEE, the hardware device to enter a secure mode, where the first switching information is used to indicate that the hardware device has exited the non-secure mode, and the secure mode is a running mode that corresponds to the hardware device and that is in the TEE.

In another implementation manner of the present invention, the switching module 120 specifically includes: an REE control module and a TEE control module.

The REE control module is configured to control, according to the TUI display request of the CA by using a driver that is of the hardware device and that is in the REE, the hardware device to exit a current non-secure mode, where the non-secure mode is a running mode that corresponds to the hardware device and that is in the REE.

The TEE control module is configured to control, according to first switching information sent by the REE control module, by using a driver that is of the hardware device and that is in the TEE, the hardware device to enter a secure mode, where the first switching information is used to indicate that the hardware device has exited the non-secure mode, and the secure mode is a running mode that corresponds to the hardware device and that is in the TEE.

In this embodiment, functions of the non-secure control unit and the REE control module may be specifically similar to those the REE control module in FIG. 1, and functions of the secure control unit and the TEE control module may be specifically similar to those of the TEE control module in FIG. 1. In addition, in this embodiment, alternatively, a function of the driver may be integrated, as a part of the switching module 120, into the switching module 120. Specifically, setting may be performed as required, and there is no special limitation in this embodiment. In addition, in this embodiment, a function of the non-secure control unit is similar to that of the REE control module, and a function of the secure control unit is similar to that of the TEE control module. For convenience of description, the following describes the technical solutions of the present invention by directly using the non-secure control unit and the secure control unit.

In an optional implementation manner of the present invention, the display module 130 is specifically configured to: run, in the TEE, a TA corresponding to the CA; and invoke the hardware device in the secure mode to display, in the TEE, the TA interface.

Based on the foregoing embodiment, in an embodiment of the present invention, the switching module 120 is further configured to: enable the terminal to switch from a current TA interface to a response interface of a first event in the REE according to a non-secure-event response message by using the display module 130, and then instruct, according to a response feedback message, the display module 130 to display the TA interface again, where the non-secure-event response message is triggered by the first event in the REE, and the response feedback message indicates that the user of the terminal completes processing of the first event by using the response interface.

In a specific implementation manner of this embodiment, the non-secure control unit is configured to send a Request for TUI display pause to the secure control unit according to the non-secure-event response message, the secure control unit is configured to control, according to the Request for TUI display pause by using the driver that is of the hardware device and that is in the TEE, the hardware device to exit a current secure mode, where the secure mode is a running mode that corresponds to the hardware device and that is in the TEE; and the non-secure control unit is further configured to control, according to second switching information sent by the secure control unit, by using the driver that is of the hardware device and that is in the REE, the hardware device to enter the non-secure mode, and then instruct the display module 130 to invoke the hardware device that has switched to the non-secure mode, to display the response interface of the first event in the REE, where the second switching information is used to indicate that the hardware device has exited the secure mode, and the non-secure mode is a running mode that corresponds to the hardware device and that is in the REE.

Based on the foregoing embodiments, in another embodiment of the present invention, the switching module 120 is further configured to instruct, according to a Request for TUI display exit, the display module 130 to switch from a current TA interface to the CA interface, where the Request for TUI display exit is triggered by the triggering module 110 according to a second operation on the TA interface by the user.

In a specific implementation manner of this embodiment, the secure control unit is configured to control, according to the Request for TUI display exit by using the driver that is of the hardware device and that is in the TEE, the hardware device to exit a current secure mode, where the secure mode is a running mode that corresponds to the hardware device and that is in the TEE; and the non-secure control unit is configured to control, according to third switching information sent by the secure control unit, by using the driver that is of the hardware device and that is in the REE, the hardware device to enter the non-secure mode, and then instruct the display module 130 to invoke the hardware device that has switched to the non-secure mode, to display, in the REE, the CA interface, where the third switching information is used to indicate that the hardware device has exited the secure mode, and the non-secure mode is a running mode that corresponds to the hardware device and that is in the REE.

The terminal provided in this embodiment of the present invention may execute the foregoing method embodiments. The terminal and the method embodiments have similar implementation principles and technical effects. Details are not described herein again.

It should be understood that, in an implementation manner, the triggering module 110, the switching module 120, and the display module 130 may be implemented by a processor executing a program or an instruction in a memory (that is, implemented by a processor in cooperation with a special instruction in a memory coupled to the processor). In another implementation manner, alternatively, the triggering module 110, the switching module 120, and the display module 130 may be implemented by using a dedicated circuit. For a specific implementation manner, refer to the prior art, and details are not described herein again. In still another implementation manner, alternatively, the triggering module 110, the switching module 120, and the display module 130 may be implemented by using a field-programmable gate array (FPGA). For a specific implementation manner, refer to the prior art, and details are not described herein again. The present invention includes, but is not limited to, the foregoing implementation manners. It should be understood that all solutions implemented according to the concept of the present invention fall within the protection scope of the embodiments of the present invention.

In the several embodiments provided in the present invention, it should be understood that the disclosed apparatus and method may be implemented in other manners. For example, the described apparatus embodiment is merely used as an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

Figure 10:
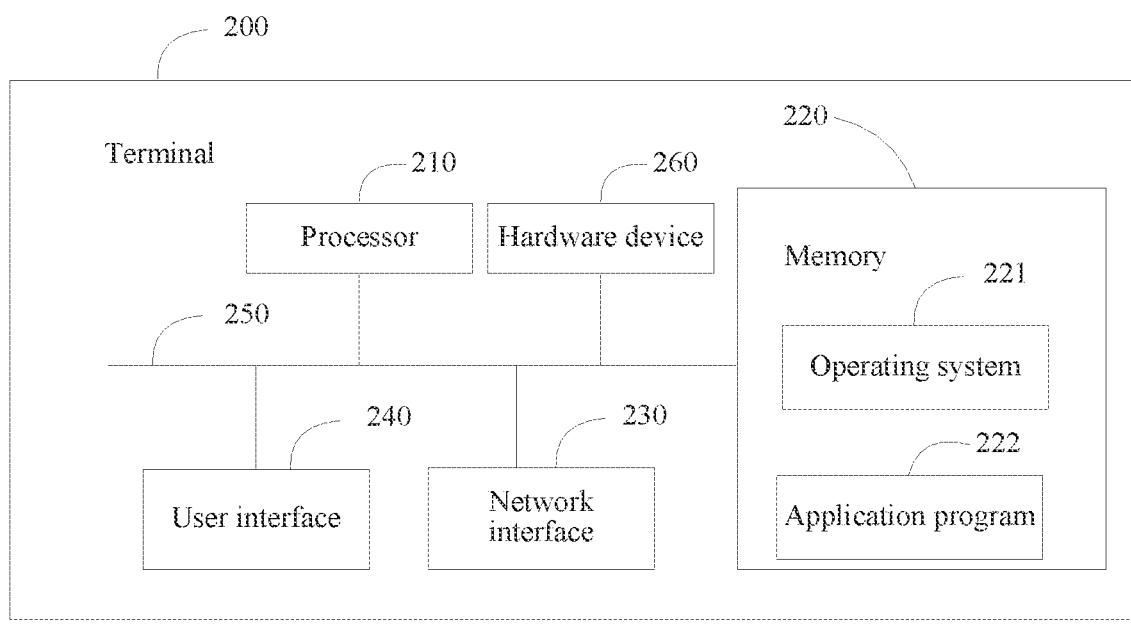
FIG. 10 is a schematic structural diagram of Embodiment 2 of a terminal according to the present invention.

FIG. 10 is a schematic structural diagram of Embodiment 2 of a terminal according to the present invention. On the terminal, a client application CA runs, and a rich execution environment and a trusted execution environment are deployed. As shown in FIG. 10, the terminal 200 in this embodiment includes: at least one processor 210, a memory 220, at least one network interface 230 or another user interface 240, at least one communications bus 250, and a hardware device 260 that is configured to display an interface of the terminal.

The communications bus 250 is configured to implement connection and communication between these components. The terminal device 200 optionally includes the user interface 240, and includes a display (for example, a touchscreen, an LCD, a CRT, holographic imaging device, or a projector), a keyboard, or a clicking device (for example, a mouse, a trackball, a touch panel, or a touchscreen).

The memory 220 may include a read-only memory and a random access memory, and provide an instruction and data to the processor 210.

In some implementation manners, the memory 220 stores the following elements, an executable module or a data structure, or a subset thereof, or an extension set thereof:

an operating system 221, including various system programs such as the REE control module, the TEE control module, and the driver modules on both sides that are shown in FIG. 1, and configured to implement various fundamental services and process hardware-based tasks; and an application program module 222, including various application programs such as the CA and the TA shown in FIG. 1, and configured to implement various application services.

The hardware device 260 that is configured to display the interface of the terminal may include a display memory, a display device, a touchscreen, and the like.

In this embodiment of the present invention, by invoking a program or an instruction stored in the memory 220, the processor 210 is configured to:

trigger a trusted user interface TUI display request of the CA according to a first operation on a CA interface of the CA by a user, where the CA interface is a user interface that is of the CA and that is in the rich execution environment;

switch a display environment of the CA from the rich execution environment to the trusted execution environment according to the TUI display request; and control the hardware device 260 to display a trusted application TA interface that is of the CA and that is in the trusted execution environment, where the TA interface is used by the user of the terminal to input personal information.

Further, in a specific implementation manner of the present invention, in an aspect of the switching a display environment of the CA from the rich execution environment to the trusted execution environment according to the TUI display request, the processor 210 is specifically configured to:

control, according to the TUI display request of the CA by using a driver that is of the hardware device and that is in the rich execution environment, the hardware device to exit a current non-secure mode, where the non-secure mode is a running mode that corresponds to the hardware device and that is in the rich execution environment; and control, according to first switching information by using a driver that is of the hardware device and that is in the trusted execution environment, the hardware device to enter a secure mode, where the first switching information is used to indicate that the hardware device has exited the non-secure mode, and the secure mode is a running mode that corresponds to the hardware device and that is in the trusted execution environment.

In an aspect of the displaying a trusted application TA interface that is of the CA and that is in the trusted execution environment, the processor 210 is specifically configured to:

run, in the trusted execution environment, a TA corresponding to the CA; and display, in the trusted execution environment, the TA interface by invoking the hardware device in the secure mode.

In an embodiment of the present invention, the processor 210 is further configured to: enable the terminal to switch from a current TA interface to a response interface of a first event in the rich execution environment according to a non-secure-event response message by using the hardware device 260, and then control, according to a response feedback message, the hardware device 260 to display the TA interface again, where the non-secure-event response message is triggered by the first event in the rich execution environment, and the response feedback message indicates that the user of the terminal completes processing of the first event by using the response interface.

Further, in a specific implementation manner of the present invention, the processor 210 is specifically configured to:

trigger a Request for TUI display pause according to the non-secure-event response message;

control, according to the Request for TUI display pause by using a driver that is of the hardware device and that is in the trusted execution environment, the hardware device to exit a current secure mode, where the secure mode is a running mode that corresponds to the hardware device and that is in the trusted execution environment; and control, according to second switching information by using a driver that is of the hardware device and that is in the rich execution environment, the hardware device to enter a non-secure mode, and then display the response interface of the first event in the rich execution environment by invoking the hardware device that has switched to the non-secure mode, where the second switching information is used to indicate that the hardware device has exited the secure mode, and the non-secure mode is a running mode that corresponds to the hardware device and that is in the rich execution environment.

In another embodiment of the present invention, the processor 210 is further configured to:

enable the terminal to switch from the current TA interface to the CA interface according to a Request for TUI display exit by using the hardware device 260, where the Request for TUI display exit is triggered according to a second operation on the TA interface by the user.

Further, in a specific implementation manner of the present invention, in an aspect of the switching from the current TA interface to the CA interface according to a Request for TUI display exit, the processor 210 is specifically configured to:

control, according to the Request for TUI display exit by using the driver that is of the hardware device and that is in the trusted execution environment, the hardware device to exit the current secure mode, where the secure mode is a running mode that corresponds to the hardware device and that is in the trusted execution environment; and control, according to third switching information by using the driver that is of the hardware device and that is in the rich execution environment, the hardware device to enter the non-secure mode, and then display, in the rich execution environment, the CA interface by invoking the hardware device that has switched to the non-secure mode, where the third switching information is used to indicate that the hardware device has exited the secure mode, and the non-secure mode is a running mode that corresponds to the hardware device and that is in the rich execution environment.

The terminal provided in this embodiment of the present invention may execute the foregoing method embodiments. The terminal and the method embodiments have similar implementation principles and technical effects. Details are not described herein again.

Figure 11:
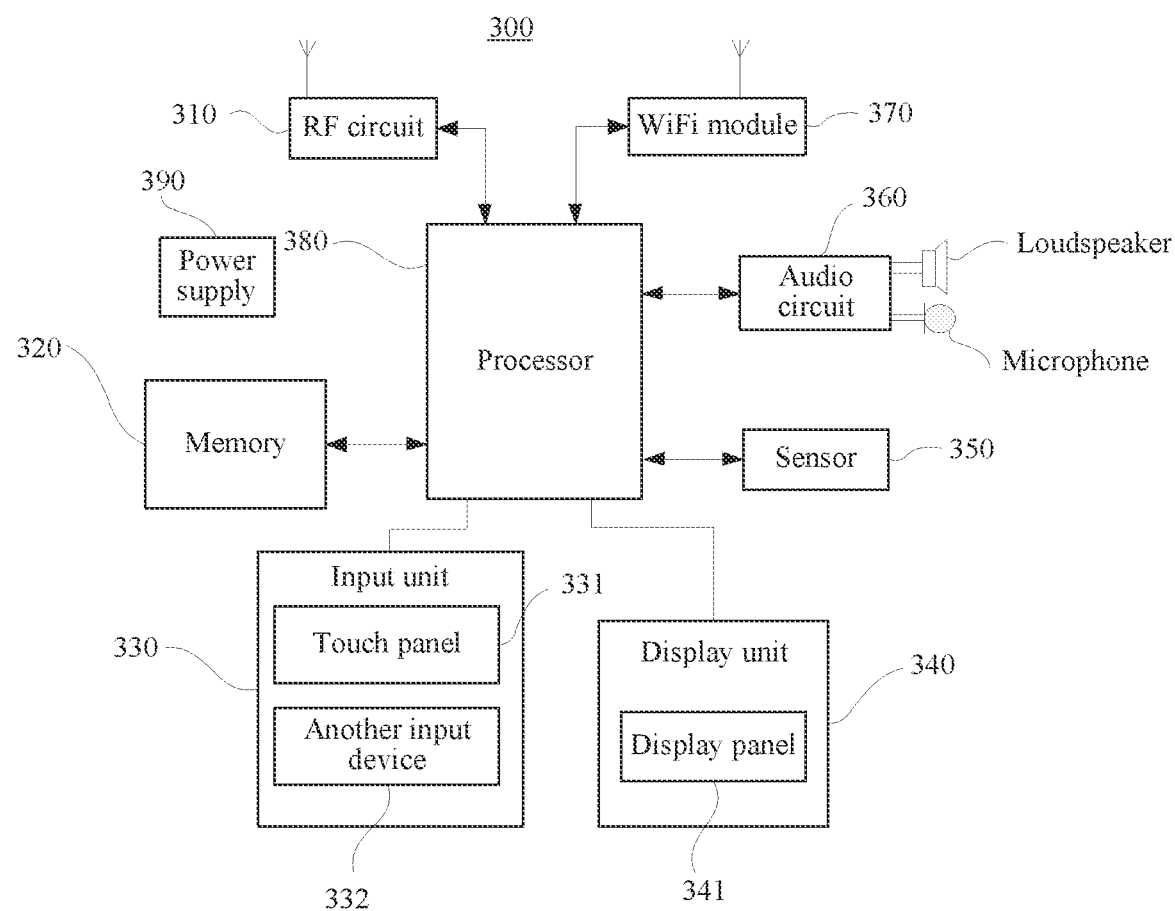
FIG. 11 is a schematic structural diagram of Embodiment 3 of a terminal according to the present invention.

FIG. 11 is a schematic structural diagram of Embodiment 3 of a terminal according to the present invention. On the terminal, a client application CA runs, and a rich execution environment and a trusted execution environment are deployed. As shown in FIG. 11, the terminal 300 in this embodiment includes components such as a radio frequency (RF) circuit 310, a memory 320, an input unit 330, a display unit 340, a sensor 350, an audio circuit 360, a wireless fidelity (WiFi) module 370, a processor 380, and a power supply 390. Persons skilled in the art may understand that a terminal structure shown in FIG. 11 constitutes no limitation to the terminal, and the terminal may include more or fewer components than those shown in the figure, or some components may be combined, or a different component deployment may be used.

The following specifically describes some components of the terminal 300 with reference to FIG. 11.

In this embodiment, the processor 380 may implement functions of the functional modules included in the terminal shown in FIG. 9. Specifically, the processor 380 is configured to:

trigger a trusted user interface TUI display request of the CA according to a first operation on a CA interface of the CA by a user, where the CA interface is a user interface that is of the CA and that is in the rich execution environment;

switch a display environment of the CA from the rich execution environment to the trusted execution environment according to the TUI display request; and control a display-related hardware device to display a trusted application TA interface that is of the CA and that is in the trusted execution environment, where the TA interface is used by the user of the terminal to input personal information.

In a specific implementation manner, in an aspect of the switching a display environment of the CA from the rich execution environment to the trusted execution environment according to the TUI display request, the processor 380 is specifically configured to:

control, according to the TUI display request of the CA by using a driver that is of the display-related hardware device and that is in the rich execution environment, the hardware device to exit a current non-secure mode, where the non-secure mode is a running mode that corresponds to the hardware device and that is in the rich execution environment; and control, according to first switching information by using a driver that is of the hardware device and that is in the trusted execution environment, the hardware device to enter a secure mode, where the first switching information is used to indicate that the hardware device has exited the non-secure mode, and the secure mode is a running mode that corresponds to the hardware device and that is in the trusted execution environment.

In an aspect of the displaying a trusted application TA interface that is of the CA and that is in the trusted execution environment, the processor 380 is specifically configured to:

run, in the trusted execution environment, a TA corresponding to the CA; and display, in the trusted execution environment, the TA interface by invoking the hardware device in the secure mode.

The display-related hardware device includes the input unit 330, the display unit 340, and another display-related device such as a display-related internal memory in the memory 320.

In an embodiment of the present invention, the processor 380 is further configured to: enable the terminal to switch from a current TA interface to a response interface of a first event in the rich execution environment according to a non-secure-event response message by using the hardware device, and then control, according to a response feedback message, the hardware device to display the TA interface again, where the non-secure-event response message is triggered by the first event in the rich execution environment, and the response feedback message indicates that the user of the terminal completes processing of the first event by using the response interface.

Further, in a specific implementation manner of the present invention, the processor 380 is specifically configured to:

trigger a Request for TUI display pause according to the non-secure-event response message;

control, according to the Request for TUI display pause by using a driver that is of the hardware device and that is in the trusted execution environment, the hardware device to exit a current secure mode, where the secure mode is a running mode that corresponds to the hardware device and that is in the trusted execution environment; and control, according to second switching information by using a driver that is of the hardware device and that is in the rich execution environment, the hardware device to enter a non-secure mode, and then display the response interface of the first event in the rich execution environment by invoking the hardware device that has switched to the non-secure mode, where the second switching information is used to indicate that the hardware device has exited the secure mode, and the non-secure mode is a running mode that corresponds to the hardware device and that is in the rich execution environment.

In another embodiment of the present invention, the processor 380 is further configured to:

enable the terminal to switch from the current TA interface to the CA interface according to a Request for TUI display exit by using the hardware device, where the Request for TUI display exit is triggered according to a second operation on the TA interface by the user.

Further, in a specific implementation manner of the present invention, in an aspect of the switching from the current TA interface to the CA interface according to a Request for TUI display exit, the processor 380 is specifically configured to:

control, according to the Request for TUI display exit by using the driver that is of the hardware device and that is in the trusted execution environment, the hardware device to exit the current secure mode, where the secure mode is a running mode that corresponds to the hardware device and that is in the trusted execution environment; and control, according to third switching information by using the driver that is of the hardware device and that is in the rich execution environment, the hardware device to enter the non-secure mode, and then display, in the rich execution environment, the CA interface by invoking the hardware device that has switched to the non-secure mode, where the third switching information is used to indicate that the hardware device has exited the secure mode, and the non-secure mode is a running mode that corresponds to the hardware device and that is in the rich execution environment.

It can be understood that the memory 320 may be an internal memory of the terminal 300, or an internal memory and an external memory of the terminal 300. The memory 320 includes an NVRAM nonvolatile memory, a DRAM dynamic random access memory, an SRAM static random access memory, a flash drive, and a hard disk, an optical disc, a USB disk, a floppy disk, or a tape drive.

The input unit 330 may be further configured to receive input digital or character information, such as a Chinese character string or a letter string that is input by a user, and generate a signal input related to user setting and function control of the terminal 300. Specifically, in this embodiment of the present invention, the input unit 330 may include a touch panel 331. The touch panel 331, which may also be referred to as a touchscreen, may collect a touch operation of a user on or near the touch panel (for example, an operation of a user on or near the touch panel 331 by using any suitable object or accessory such as a finger or a stylus), and drive a corresponding connection apparatus according to a preset program. Optionally, the touch panel 331 may include two parts: a touch detection apparatus and a touch controller. The touch detection apparatus detects a touch azimuth of the user, detects a signal generated from the touch operation, and transfers the signal to the touch controller. The touch controller receives touch information from the touch detection apparatus, converts the touch information into touch point coordinates, and then sends the touch point coordinates to the processor 380. Moreover, the touch controller can receive and execute a command sent from the processor 380. In addition, the touch panel 331 may be a resistive, capacitive, infrared, or surface sound wave type touch panel. Besides the touch panel 331, the input unit 330 may further include another input device 332. The another input device 332 may include, but is not limited to, one or more of a physical keyboard, a function key (for example, a volume control key and a switch key), a track ball, a mouse, a joystick, or the like.

The terminal 300 may further include the display unit 340. The display unit 340 may be configured to display information input by the user or information provided to the user, and various menu interfaces of the terminal 300. Specifically, the display unit 340 may include a display panel 341, and optionally, the display panel 341 may be configured in a form such as a liquid crystal display (LCD), an organic light-emitting diode (OLED), or the like.

In this embodiment of the present invention, the touch panel 331 covers the display panel 341, to form a touch display screen. After the touch display screen detects a touch operation on or near the touch display screen, the touch display screen transmits the touch operation to the processor 380 to determine a type of a touch event, and then the processor 380 provides a corresponding visual output on the touch display screen according to the type of the touch event.

In this embodiment of the present invention, the touch display screen includes an application program interface display area and a common control display area. An arrangement manner of the application program interface display area and the common control display area is not limited, and may be an arrangement manner in which the two display areas can be distinguished, for example, up-and-down arrangement or left-and-right arrangement. The application program interface display area may be used to display an interface of an application program. Each interface may include an interface element such as an icon and/or a desktop control of at least one application program. Alternatively, the application program interface display area may be a blank interface that does not include any content. The common control display area is used to display a control that is used relatively frequently, for example, a setting button, an interface number, a scroll bar, and a application program icon such as a phone book icon.

The processor 380 is a control center of the terminal 300, connects parts of the entire terminal by using various interfaces and lines, and performs various functions of the terminal 300 and processes data by running or executing a software program and/or a module and data that are stored in the memory 320, thereby performing overall monitoring on the terminal 300. Optionally, the processor 380 may include one or more processing units.

The terminal provided in this embodiment may execute the foregoing method embodiments. The terminal and the method embodiments have similar implementation principles and technical effects. Details are not described herein again.

Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A user interface switching method, comprising:
triggering a trusted user interface (TUI) display request of a client application (CA) according to a first operation on a CA interface of the CA by a user, wherein the CA runs on a device on which a rich execution environment and a trusted execution environment are deployed, and wherein the CA interface is a user interface that is in the rich execution environment;
switching a display environment of the CA from the rich execution environment to the trusted execution environment;
displaying a trusted application (TA) interface of the CA in the trusted execution environment, wherein the TA interface is used for sensitive information input; and
wherein the device comprises a display-related hardware device, the display-related hardware device is configured to display the CA interface and the TA interface, and switching the display environment of the CA from the rich execution environment to the trusted execution environment comprises:
controlling, according to the TUI display request of the CA by using a first driver that is of the display-related hardware device and that is in the rich execution environment, the display-related hardware device to exit a current non-secure mode, wherein the non-secure mode is a running mode that corresponds to the display-related hardware device and that is in the rich execution environment;
after the display-related hardware device exits the non-secure mode, generating, by the first driver in the rich execution environment, first switching information, wherein the first switching information indicates that the display-related hardware device has exited the non-secure mode; and
controlling, according to the first switching information by using a second driver that is of the display-related hardware device and that is in the trusted execution environment, the display-related hardware device to enter a secure mode, wherein the secure mode is a running mode that corresponds to the display-related hardware device and that is in the trusted execution environment.

2. The method according to claim 1, wherein displaying the TA interface of the CA in the trusted execution environment comprises:
running, in the trusted execution environment, a TA corresponding to the CA; and
displaying, in the trusted execution environment, the TA interface by invoking the display-related hardware device in the secure mode.

3. The method according to claim 1, further comprising:
displaying the TA interface, after determining that the user of the device has completed processing of a first event triggered in the rich execution environment by using a response interface.

4. The method according to claim 1, wherein the method further comprises:
triggering a request for TUI display pause according to a first event triggered in the rich execution environment;
controlling, according to the request for TUI display pause by using the second driver that is of the display-related hardware device and that is in the trusted execution environment, the display-related hardware device to exit the secure mode;
controlling, according to second switching information by using the first driver that is of the display-related hardware device and that is in the rich execution environment, the display-related hardware device to enter the non-secure mode, wherein the second switching information indicates that the display-related hardware device has exited the secure mode; and
displaying a response interface of the first event in the rich execution environment by invoking the display-related hardware device that has switched to the non-secure mode.

5. The method according to claim 1, further comprising:
switching from the TA interface to the CA interface according to a request for TUI display exit, wherein the request for TUI display exit is triggered by a second operation on the TA interface by the user.

6. The method according to claim 5, wherein switching from the TA interface to the CA interface according to the request for TUI display exit comprises:

controlling, according to the request for TUI display exit by using the second driver that is of the display-related hardware device and that is in the trusted execution environment, the display-related hardware device to exit the secure mode;

controlling, according to third switching information by using the first driver that is of the display-related hardware device and that is in the rich execution environment, the display-related hardware device to enter the non-secure mode, wherein the third switching information indicates that the display-related hardware device has exited the secure mode; and displaying, in the rich execution environment, the CA interface by invoking the display-related hardware device that has switched to the non-secure mode.

7. The method according to claim 1, wherein the TA interface of the CA in the trusted execution environment comprises a virtual keyboard.

8. The method according to claim 1, wherein the display environment of the CA is switched from the rich execution environment to the trusted execution environment while a background running environment of the CA remains the rich execution environment.

9. The method according to claim 1, wherein before displaying the TA interface of the CA, the method further comprises:

obtaining an identifier of a TA corresponding to the CA; and invoking the TA according to the identifier of the TA.

10. A device, comprising:

a hardware device configured to display an interface of the device;

at least one processor coupled to the hardware device; and one or more memories coupled to the at least one processor and storing programming instructions for execution by the at least one processor to:

trigger a trusted user interface (TUI) display request of a client application (CA) according to a first operation on a CA interface of the CA, wherein the CA runs on the device on which a rich execution environment and a trusted execution environment are deployed, and wherein the CA interface is a user interface that is in the rich execution environment;

switch a display environment of the CA from the rich execution environment to the trusted execution environment;

control the hardware device to display a trusted application (TA) interface of the CA in the trusted execution environment, wherein the TA interface is used for sensitive information input; and wherein switching the display environment of the CA from the rich execution environment to the trusted execution environment comprises:

controlling, according to the TUI display request of the CA by using a first driver that is of the hardware device and that is in the rich execution environment, the hardware device to exit a current non-secure mode, wherein the non-secure mode is a running mode that corresponds to the hardware device and that is in the rich execution environment;

after the hardware device exits the non-secure mode, generating, by the first driver in the rich execution environment, first switching information, wherein the first switching information indicates that the hardware device has exited the non-secure mode; and controlling, according to the first switching information by using a second driver that is of the hardware device and that is in the trusted execution environment, the hardware device to enter a secure mode, wherein the secure mode is a running mode that corresponds to the hardware device and that is in the trusted execution environment.

11. The device according to claim 10, wherein displaying the TA interface of the CA in the trusted execution environment comprises:

running, in the trusted execution environment, a TA corresponding to the CA; and displaying, in the trusted execution environment, the TA interface by invoking the hardware device in the secure mode.

12. The device according to claim 10, wherein the one or more memories storing the programming instructions for execution by the at least one processor to:

control, the hardware device to display the TA interface, after determining completing processing of a first event triggered in the rich execution environment by using a response interface.

13. The device according to claim 10, wherein the one or more memories storing the programming instructions for execution by the at least one processor to:

trigger a request for TUI display pause according to a first event triggered in the rich execution environment;

control, according to the request for TUI display pause by using the second driver that is of the hardware device and that is in the trusted execution environment, the hardware device to exit the secure mode; and control, according to second switching information by using the first driver that is of the hardware device and that is in the rich execution environment, the hardware device to enter the non-secure mode, and display a response interface of the first event in the rich execution environment by invoking the hardware device that has switched to the non-secure mode, wherein the second switching information indicates that the hardware device has exited the secure mode.

14. The device according to claim 10, wherein the one or more memories storing the programming instructions for execution by the at least one processor to:

enable the device to switch from the TA interface to the CA interface according to a request for TUI display exit by using the hardware device, wherein the request for TUI display exit is triggered by a triggering module according to a second operation on the TA interface.

15. The device according to claim 14, wherein switching from the TA interface to the CA interface according to the request for TUI display exit comprises:

controlling, according to the request for TUI display exit by using the second driver that is of the hardware device and that is in the trusted execution environment, the hardware device to exit the secure mode; and controlling, according to third switching information by using the first driver that is of the hardware device and that is in the rich execution environment, the hardware device to enter the non-secure mode, and display, in the rich execution environment, the CA interface by invoking the hardware device that has switched to the non-secure mode, wherein the third switching information indicates that the hardware device has exited the secure mode.

16. A non-transitory computer-readable media storing computer instructions for user interface switching, that when executed by one or more processors, cause the one or more processors to perform operations comprising:
- triggering a trusted user interface (TUI) display request of a client application (CA) according to a first operation on a CA interface of the CA by a user, wherein the CA runs on a device on which a rich execution environment and a trusted execution environment are deployed, and wherein the CA interface is a user interface that is in the rich execution environment;
- switching a display environment of the CA from the rich execution environment to the trusted execution environment according to the TUI display request;
- displaying a trusted application (TA) interface of the CA in the trusted execution environment, wherein the TA interface is used to input sensitive information; and
- wherein a display-related hardware device is configured to display the CA interface and the TA interface, and switching the display environment of the CA from the rich execution environment to the trusted execution environment comprises:
  - controlling, according to the TUI display request of the CA by using a first driver that is of the display-related hardware device and that is in the rich execution environment, the display-related hardware device to exit a current non-secure mode, wherein the non-secure mode is a running mode that corresponds to the display-related hardware device and that is in the rich execution environment;
  - after the display-related hardware device exits the non-secure mode, generating, by the first driver in the rich execution environment, first switching information, wherein the first switching information indicates that the display-related hardware device has exited the non-secure mode; and
  - controlling, according to the first switching information by using a second driver that is of the display-related hardware device and that is in the trusted execution environment, the display-related hardware device to enter a secure mode, wherein the secure mode is a running mode that corresponds to the display-related hardware device and that is in the trusted execution environment.

17. The non-transitory computer-readable media according to claim 16, wherein displaying the TA interface that is of the CA and that is in the trusted execution environment comprises:
- running, in the trusted execution environment, a TA corresponding to the CA; and
- displaying, in the trusted execution environment, the TA interface by invoking the display-related hardware device in the secure mode.

18. The non-transitory computer-readable media according to claim 16, wherein the operations further comprise:
- displaying the TA interface, after determining that the user of the device has completed processing of a first event triggered in the rich execution environment by using a response interface.

19. The non-transitory computer-readable media according to claim 18, wherein the operations further comprise:
- triggering a request for TUI display pause;
- controlling, according to the request for TUI display pause by using the second driver that is of the display-related hardware device and that is in the trusted execution environment, the display-related hardware device to exit the secure mode;
- controlling, according to second switching information by using the first driver that is of the display-related hardware device and that is in the rich execution environment, the display-related hardware device to enter the non-secure mode, wherein the second switching information indicates that the display-related hardware device has exited the secure mode; and
- displaying a response interface of the first event in the rich execution environment by invoking the display-related hardware device that has switched to the non-secure mode.

20. The non-transitory computer-readable media according to claim 16, wherein the operations further comprise:
- switching from the TA interface to the CA interface according to a request for TUI display exit, wherein the request for TUI display exit is triggered by a second operation on the TA interface by the user.

* * * * *